May 14, 1935.　　　H. E. ALTGELT　　　2,001,560
LISTER PLANTER
Filed Oct. 19, 1932　　　4 Sheets-Sheet 1
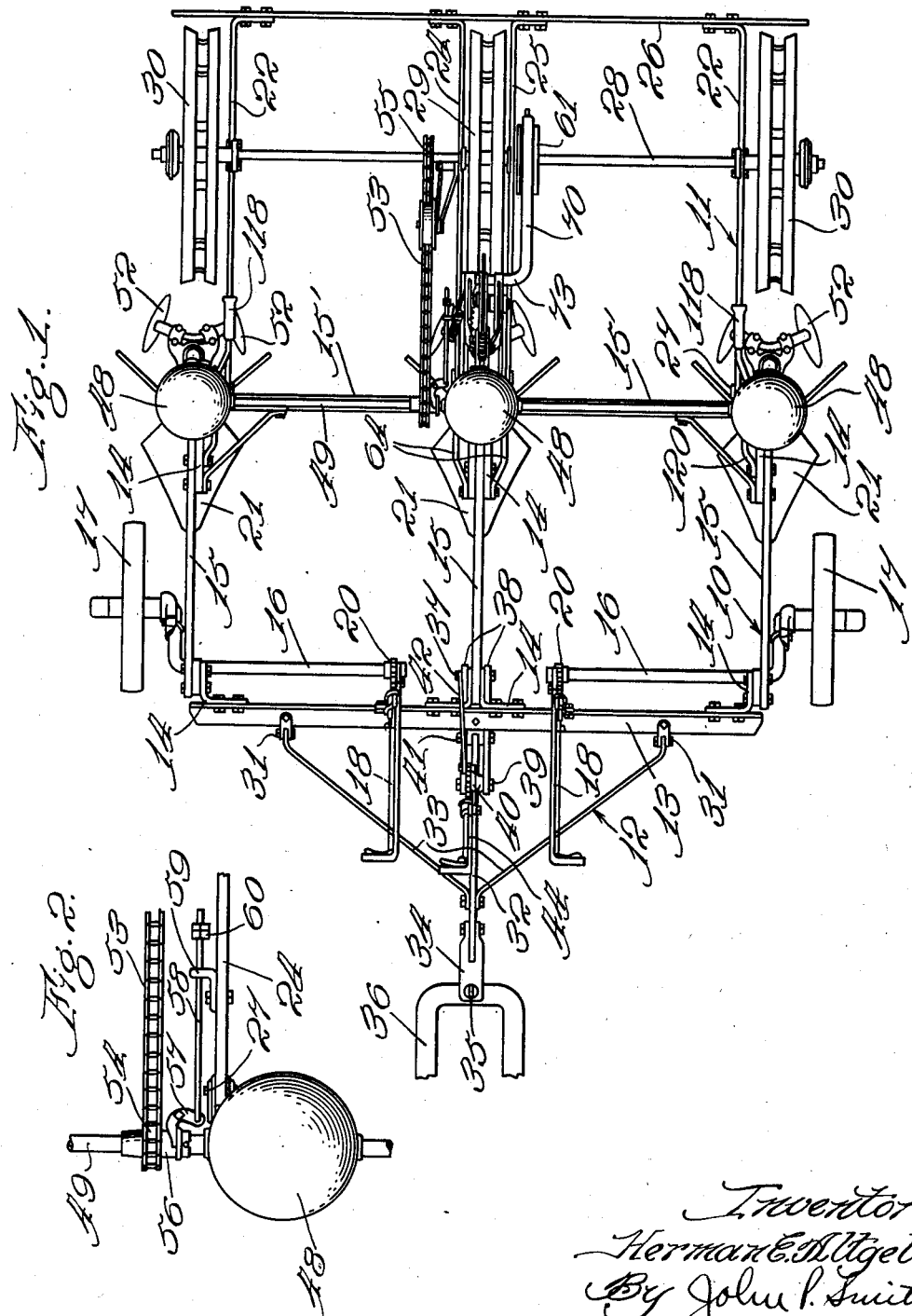

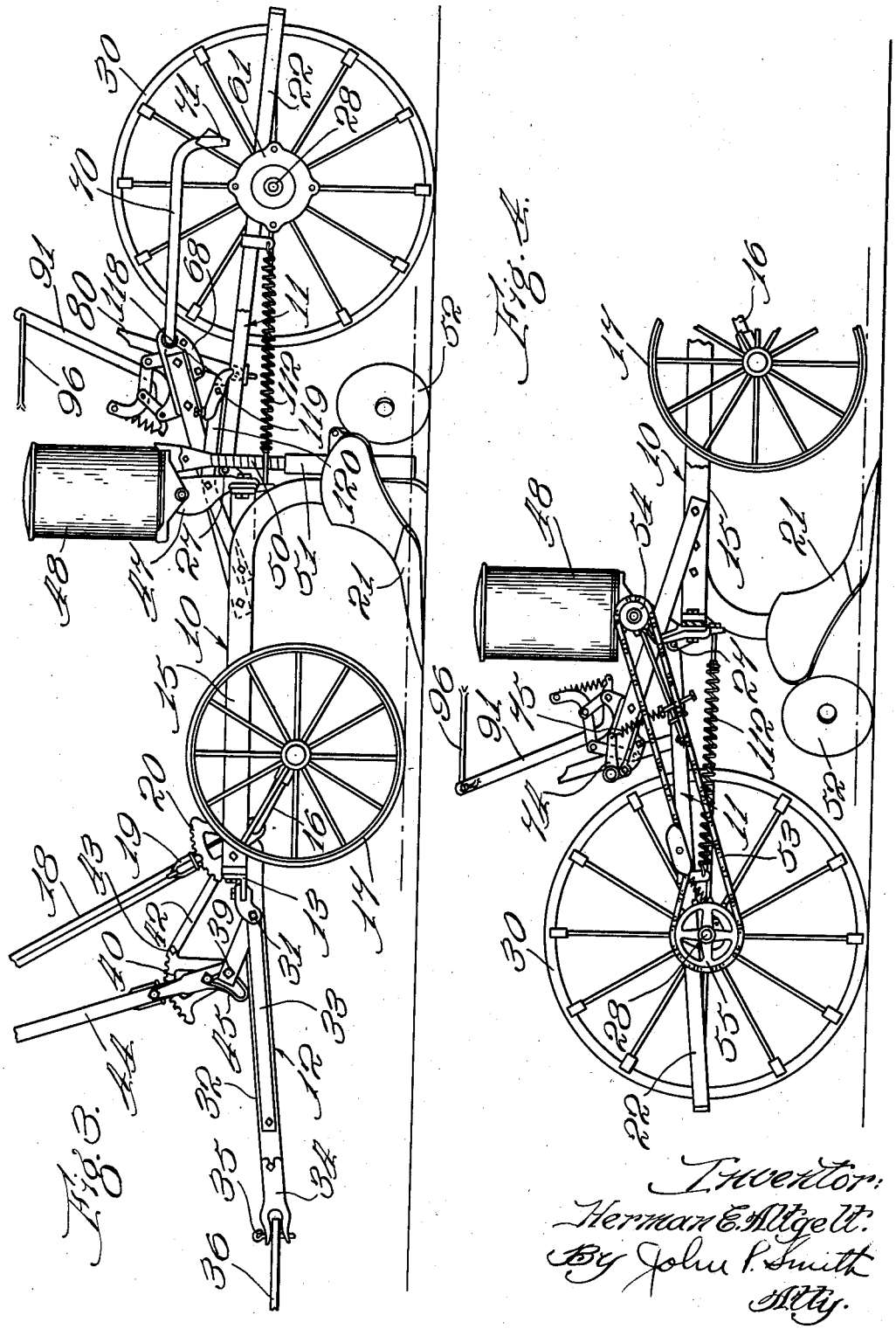

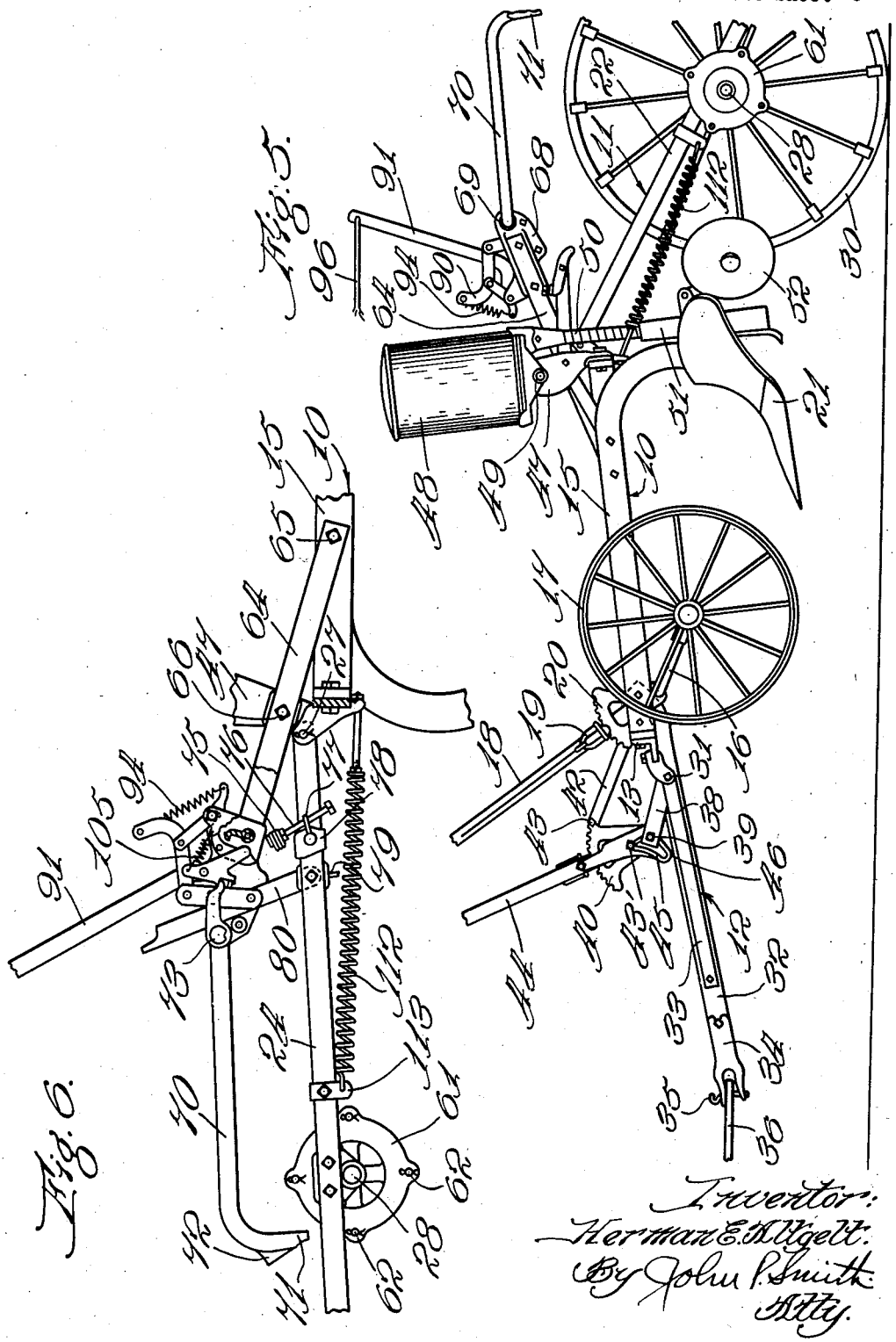

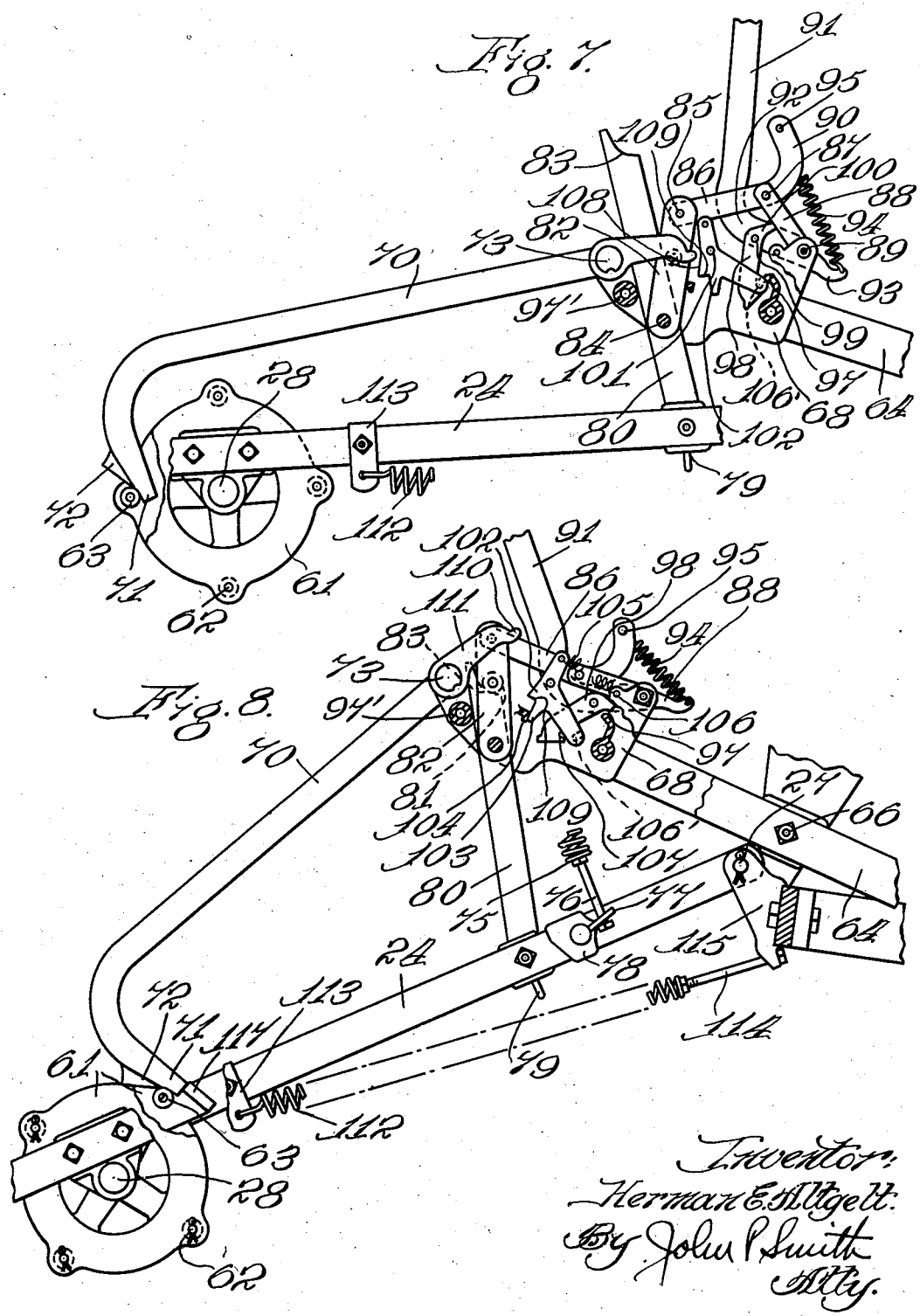

Patented May 14, 1935

2,001,560

UNITED STATES PATENT OFFICE 2,001,560

LISTER PLANTER

Herman E. Altgelt, South Bend, Ind., assignor to Oliver Farm Equipment Company, a corporation of Delaware Application October 19, 1932, Serial No. 638,489

22 Claims. (Cl. 97—72)

The present invention is directed generally to a lister planter, but more particularly to a power lift lister planter which is simple in construction and efficient in operation.

One of the objects of the present invention is to provide a novel and improved construction of a power lift three row lister planter which is adapted to be drawn by traction power and preferably supported on a front and rear frame construction, each of which being provided with supporting wheels and an arrangement by which the front wheels may be lifted off the ground and supported on the draw bar of the tractor for turning at the end of the row, or for the purpose of transportation.

A further object of the invention is to provide a novel and improved power lift lister planter having a front and rear frame construction pivoted together whereby on the actuation of the power lift connected with the rear press wheels, these frames are actuated with respect to each other so as to raise the front supporting frame off the ground.

A still further object of the invention is to provide a novel and improved lister planter in which a pivoted draft frame is provided with a novel adjustment whereby the upward pivotal movement of the draft frame may be limited so as to accommodate tractor draft bars of varying height.

These and other objects are accomplished by providing a construction and arrangement of the various parts in the manner hereinafter described and particularly pointed out in the appended claims.

Referring to the drawings, Fig. 1 is a top plan view of my improved lister planter;

Fig. 2 is an enlarged fragmentary detailed view of the clutch controlling mechanism;

Fig. 3 is a side elevational view of the lister planter shown in Fig. 1 with the operating parts thereof lowered to their operative positions;

Fig. 4 is a fragmentary view partly in cross section showing the drive for operating the planting mechanism;

Fig. 5 is a side elevational view of the lister planter shown in Figs. 1 and 2 in which the planting mechanism as well as the front frame thereof is raised to its inoperative position or transporting position;

Fig. 6 is an enlarged fragmentary detailed view showing the position of the power lifting mechanism prior to operating the trip lever to raise the planter;

Fig. 7 is an enlarged fragmentary view of the power lift mechanism showing the position of the various parts after the lever has been tripped, and Fig. 8 is a view of the same parts shown in Fig. 7 at the conclusion of the lifting operation.

For the purpose of illustration, I have shown my improved lister planter as comprising a front main frame generally indicated by the reference character 10, to which is pivotally connected a rear frame 11 and a front draft frame connected to the forward end of the main frame 10, as shown generally at 12. The front frame 10 comprises a transversely extending front angle member 13 and a transversely extending rear frame member 15' to which are suitably secured by means of brackets 14 rearwardly extending and laterally adjustable lister beams 15, of which there are three in number and equally spaced with respect to each other and in effect form part of the front frame. It will be understood that a greater or lesser number of planting units may be employed. Secured to the forward portion of the front frame 10 by means of crank axles 16, are supporting or gauge wheels 17. These supporting wheels may be vertically adjusted with respect to the main frame 10 by means of levers 18 which have their lower ends connected to the crank axle 16 and are adapted to be locked by a conventional detent mechanism 19 into a locking sector 20 secured to the frame member 13 in any well known manner. Obviously, this adjustment controls the depth penetration of the lister bases 21 secured to each of the lower ends of the beams 15. The rear frame 11 comprises longitudinally extending side frame members 22 and intermediate spaced apart central longitudinal members 24 and 25, all of which have their rear ends connected by rear transverse member 26. The forward ends of each of these longitudinally extending frame members 22, 24 and 25 are pivotally connected to the front frame 10, as shown at 27. Journalled in suitable bearings and secured to each of the longitudinally extending side frame members 22, 24 and 25 is a shaft 28 to which the center press wheel 29 is rigidly secured. The outer press wheels 30 are connected to the shaft 28 by ratchets or clutch mechanism of any conventional construction which permits either of these outer wheels to drive the axle forwardly or permits the axle to advance at a more rapid speed than either of these wheels. Connected to the forward ends of the front frame 10 by means of hinges 31 is a draft frame 12 which includes a central longitudinally extending draft member 32. Diverging rearwardly from the longitudinal draft frame member 32 are two supplemental draft frame members 33 which have their rear ends connected to the hinge member 31. Secured to the forward end of the draft member 32 is a draft clevis 34 which has its forward end pivotally connected, as shown at 35, to the draft bar 36 of a tractor. Extending beneath the transverse front frame member 13 and secured by means of a bolt 37 to the center beam 15 are two spaced apart bars 38 which have their forward ends bent upwardly and secured by means of a bolt 39 to a locking sector 40. Extending transversely through an intermediate portion of these bars 38 which also forms the pivot for the rear end of the draft member 32, is a bolt 41. The upper end of the sector 40 is braced in position by means of a steel strap 42 which has its forward end bolted as shown at 43, to the sector 40, and its rearward end secured to the bolt 37. Pivotally mounted on the sector 40 by means of a bolt 43' is a hand operating lever 44 which is located within easy reach of the operator on the seat of the tractor, for adjusting the lever. The lower end of the lever 44 is provided with a looped or slotted arm, as shown at 45, which is adapted to embrace the bolt 39, as clearly shown in Figs. 3 and 5 of the drawings. The lower portion of this looped or slotted arm 45 is adapted to contact with the upper edge of the central longitudinal draft member 32, as shown at 46.

From the above description it will be readily seen that if the lever 44 is depressed forwardly, the looped arm 45 of the lever will depress the draft frame 12 together with the draft bar 32 downwardly about its pivots 31 and 41 with respect to the front frame 10, and when the lever 44 is actuated rearwardly it will lift the looped arm 45 away from the draft member 32 so that the draft frame, as a whole, is free to move upwardly to a point contacting the member 32 with the loop 45, so that the lister planter may be connected to the draft bar of the tractor regardless of its elevation from the ground.

Mounted on suitable brackets 47 secured in spaced relation to the transverse rear frame member 15' of the front frame 10, are the usual seed cans 48 which in turn are provided with the usual seed feeding mechanism of any conventional form and are preferably driven by single transverse shafts 49. These seed cans in turn are provided with the usual seed tubes 50 which in turn communicate with the co-operating seed boots 51 for conducting the seed rearwardly of each lister base 21. Positioned rearwardly of each lister base 21 and supported on the respective beams thereof, are the usual covering disks 52 of any well known construction. The seed shaft 49 is operatively driven by means of the main drive shaft 28 through the medium of a drive chain 53 trained about sprockets 54 and 55, secured to the shafts 49 and 28 respectively. The sprocket 54 is journalled on the shaft 49 and is adapted to co-operate with a shiftable clutch member 56 which in turn is splined to the shaft 47. The clutch member 56 is normally spring pressed into its clutching engagement with the sprocket 54 and is released therefrom by a clutch fork 57. This clutch fork 57 is in the form of a bell-crank and has one arm thereof connected by means of a rod 58 to a bracket 59. The rod 58 extends through an aperture in this bracket, as clearly shown in Fig. 2 of the drawings. This bracket 59 is secured to the longitudinally extending central frame member 24 and is arranged to engage an adjustable nut 60 for disengaging the clutch when the rear frame 11 assumes a certain predetermined angle about its pivot with respect to the frame 10.

An important feature of the present invention is a novel and improved power lift mechanism for effecting the raising or lowering of the lister planter from its operative position to its inoperative position and vice versa. This mechanism includes a main lift wheel or disk 61 which is secured to the main drive shaft 28. Journalled on pins 62, of which there are four in number, and spaced equally apart about the disk are rollers 63. Secured to the center beam or frame member 15 and extending rearwardly and upwardly with respect thereto, are two spaced apart bars 64 which have their forward ends secured by means of bolts 65 to the center beam, and their intermediate portion secured by means of bolts 66 to the center can supporting bracket 47. Mounted between these bars 64 and adjacent the rear ends thereof are two oppositely disposed castings or housing brackets 68. Journalled in rearwardly extending bearings 69 of the brackets 68 is a lifting arm 70 which has its rear end bent downwardly and pointed, as shown at 71. Formed on the rear side of this pointed portion is a wedge shape projection, as shown at 72, which is adapted to engage one of the rollers 63 as clearly shown in Figs. 7 and 8 of the drawings, for the purpose hereinafter described. The lifting arm 70 is provided with a right angularly bent portion 73 formed on its forward end and is journalled in each of the bearing portions 69 of the bearing brackets 68. Secured to one end of the right angularly bent portion 73 is a crank 74 which has its free end connected by means of a spring 75 to an adjustable bolt 76. The bolt 76 is adapted to move or slide through an eye 77 formed on the bracket 78, secured to the longitudinally extending frame member 24. When the lister is being raised by means of the power lift, the frame member 24 moves about its pivot 27 in a direction away from the crank 74 and places the spring 75 under spring tension so as to disengage the lifting arm 70 from the lifting disk 61 at the conclusion of the lifting operation in a manner as will be more fully described. Extending between the longitudinal frame members 24 and 25 is a cross member 79, which in addition to forming a brace between these members, forms a pivotal support for the lift supporting member 80. This supporting member 80 is fastened to the cross member 79 so that it may move forwardly or backwardly a very small amount while the lister is being raised or lowered. While the lister is in its working or plowing position the support 80 performs no function. When the lister is raised to the position shown in Fig. 8, a roller 81 journalled on and between the links 82 moves to and rests on the curved surface 83 formed on the upper end of the supporting member 80. The lower ends of the link 82 are pivotally connected on studs 84 formed on the opposite brackets 68. It will be noted that the support 80 is mounted between these links and is free to move between these studs 84. Pivotally connected, as shown at 85, are links 86. An intermediate portion of the links 85 are pivotally connected, as shown at 87, to the links 88. The forward ends of the links 88 are pivotally connected, as shown at 89, to the oppositely disposed bracket 68. The forward ends of the links 86 are provided with an upwardly curved portion, as shown at 90. Mounted between the links 86 and 88 is a trip lever 91 which has a forwardly curved portion 92 pivoted on a bolt 89. A forwardly projecting portion 93 of the lever 91 is connnected by means of a spring 94 to the upwardly curved portion 90 of the link 83 by means of a pin 95. Each of the links 82, 86 and 88 are arranged in pairs and provided with suitable spacers so that the supporting member 80 and the lever 91 may extend therebetween and operate to effect their proper movement for operating the power lifting mechanism. The upper or free end of the lever 91 is connected by means of a rope 96 to the operator's seat on the tractor, so that the same may be easily manipulated for controlling the operation of the power lifting mechanism. The pin or spacer bolt 87 forming the connection between the links 86 and links 88 is adapted to be engaged by the curved portion 92 of the lever 91 for actuating these links from the dead center position, shown in Fig. 8, to the position shown in Fig. 7. It will also be noted that the spring 94 performs the function of returning the lever 91 from the position shown in Fig. 8 to the position shown in Fig. 7, after it has been drawn forwardly by the cord 96. The lever 91 is adapted to rest against the stop 97 formed on one of the castings or brackets 68, as clearly shown in Fig. 8 of the drawings. This stop prevents the lever 91 from moving rearwardly too far. Interposed between the two opposite castings 68 is a spreader pipe 97' which holds these castings in spaced relation and at the same time forms a stop for the rearward movement of the support 80, and prevents it from interfering with or touching the lifting arm 70. Pivoted to the curved portion 92 of the lever 91 is a gravity latch 98 which is pivoted, as shown as 99, and has a curved portion 100 which is located on the opposite sides of the lever 91 and adapted to be engaged by the lower edges of the links 88, as clearly shown in Figs. 7 and 8 of the drawings. This gravity latch hangs vertically downward normally except when actuated by the links 88 to do otherwise. Pivotally mounted on a stud 101 formed on one of the castings 68 is a latch 102. The latch 102 is provided with a downwardly projecting lug 103 which is adapted to engage a stop 104 formed on one of the castings 68. The latch 102 is normally pressed against the stop 104 by a spring 105 which has one end thereof connected to the latch above its pivot, and the other end thereof connected, as shown at 106, to one of the brackets 68. Formed on one of the arms of the latch 102 is a laterally projecting lug 106' which is adapted to engage the hooked end portion 107 of the gravity latch 98. The latch 102 is provided with a sliding surface 108, and a notched portion 109 which is adapted to engage a hooked portion 110 formed on the crank 111 which in turn is secured to the right angularly turned portion 73 of the lifting arm 70. In order to counterbalance some of the weight in effecting the lift of the lister planter several extension springs 112 may be provided which are connected at their rear end by means of brackets 113 secured to the longitudinal bars 24 and 25, and by means of adjusting bolts 114 connected to the pivot bracket 115 secured to the front frame member.

The operation of my improved lister planter is as follows:

Let us assume that the lister planter is in its operative or plowing position as shown in Figs. 3, 4 and 6 of the drawings, and the operator is desirous of lifting the lister planter from this position to its inoperative position, or the position shown in Fig. 5 of the drawings. To effect this adjustment the operator on the tractor pulls the rope or cord 96 forwardly actuating the lever 91 forwardly, causing the hooked portion 107 of the gravity latch 98 to engage the laterally projecting lug 106 on the latch 102 to disengage the notch 109 of the latch 102 from the forwardly projecting lug 110 of the crank 111, thereby permitting the lifting arm 70 to drop by gravity and have its rear end, as shown at 71, fall between the lifting disks 61 so as to engage one of the rollers 63 of the lifting wheel or disks, as clearly shown in Fig. 7 of the drawings. As the lister planter moves forwardly, the shaft 28 revolves by the action of the press wheels 29 and 30 thereby revolving the lifting disk or wheel 61 so as to force the lifting arm forwardly to the position shown in Fig. 8 of the drawings. This movement elevates the front frame 10 relative to the rear frame 11 about their common pivots 27 and disengages the lister bases 21, as well as the front wheels 17 from the ground. It will be noted that as the front frame 10 begins to assume an angular position with respect to the rear frame 11, the bolt 76 slides through the ear 77 of the bracket 78, and the spring 75 becomes extended because the shaft portion 73 of the lifting arm 70 moves in a direction away from the longitudinal frame member 24 and when the pointed end 71 of the lifting arm 70 strikes the throw-out 117 carried by the frame member 24, the arm 70 swings or flies up to the position shown in Fig. 5. However, preceding this action the roller 81 carried by the links 82 becomes seated in the curved recess 83 of the supporting member 80, and the links 86 and 88 lock on dead center, or in the position shown in Fig. 8, with the spacer bolt 87 resting on the upper curved surface 92 of the lever 91, as clearly shown in Fig. 8 of the drawings.

If the operator is desirous of lowering the lister planter from the position shown in Fig. 5 to working position, or the position shown in Fig. 3, the operator on the tractor pulls the cord 96 forwardly, thereby actuating the lever 91 forwardly, which in turn lifts the spacer bolt 87 forming the pivotal connection between the levers 86 and 88, thereby withdrawing the roller 81 from its seat 83 on the top of the supporting member 80, and the lister bases 21 together with the wheels 17 will be lowered to the ground by gravity, against the tension of the extension springs 112, in which case, the lister bases will assume the position shown in Figs. 3 and 4 of the drawings to a position in which the adjustable stops 118 pivoted at 119 will engage the side frame members of the rear frame 11. These adjustable stops 118 are carried by the rearwardly extending arm 120 secured to the front frame 10 in any well known manner.

From the above description it will be readily seen that I have provided a simple, compact and efficiently operated power lift lister planter and one in which the control of the same is within easy reach of the operator on the tractor seat. It will also be noted that by manipulating the cord, the earth working implements may be raised out of the ground for turning at the end of the field or for transporting the lister planter.

While in the above specification I have described one embodiment which my invention may assume in practice, it will of course, be understood that the same is capable of modification and that modification may be made without departing from the spirit and scope of the invention as expressed in the following claims.

What I claim as my invention and desire to secure by Letters Patent is:

1. A planter comprising a front frame, a rear frame pivoted to said front frame, press wheels for supporting said rear frame, adjustable gauge wheels for said front frame, a plurality of ground engaging tools carried by said front frame, and means associated with said frames and operatively connected with said press wheels for raising said front frame relative to said rear frame and for raising said gauge wheels off the ground and said tools out of the ground.

2. A planter comprising a front frame, a rear frame pivoted to said front frame, press wheels for supporting said rear frame, a draft frame connected to said front frame and adapted to be connected to the draw bar of a tractor, supporting wheels for said front frame, a plurality of planting units carried by said front frame, and power lift means associated with said front frame and adapted to be operatively connected with said press wheels for actuating said frames about their pivots for raising said front frame with respect to said rear frame and for raising said supporting wheels upwardly with respect to the ground.

3. A planter comprising a front frame, wheel supports for said front frame, a rear frame pivoted to said front frame, wheel supports for said rear frame, a power lift mechanism for raising said front frame, a draft frame pivoted to said front frame, and means for adjusting and limiting the upward movement of said draft frame with respect to said front frame.

4. A planter comprising a front frame, wheel supports for said frame, a plurality of planting units carried by said frame, a power lift mechanism for said frame, a rear frame pivoted to said front frame, press wheels for supporting said rear frame, a draft frame pivoted to the forward end of said front frame, and an operating lever carried by said front frame and engageable with said draft frame for limiting the upward movement of said draft frame with respect to said front frame.

5. A planter comprising a front frame, adjustable wheel supports for said frame, a plurality of planting units mounted on said frame, a rear frame pivoted to said front frame, press wheels for supporting said rear frame, a power lift mechanism for raising said main frame, means for limiting the upward movement of said rear frame with respect to said front frame, a draft frame pivoted to the forward end of said front frame, and a forwardly projecting lever operable from the tractor seat for adjusting and limiting the upward movement of said draft frame with respect to said front frame.

6. A planter comprising a front frame, wheel supports for said frame, a plurality of planting units mounted on said frame, a rear frame pivoted to said front frame, press wheels supporting said rear frame, a lifting disk operatively connected with said press wheels, and a power lift mechanism carried by said front frame having an arm adapted to engage said lifting disk for pivoting said frames with respect to each other and lifting said planting units out of the ground.

7. A planter comprising a front frame, wheel supports for said frame, a plurality of planting units mounted on said frame, a rear frame pivoted to said front frame, a drive shaft mounted in said rear frame, press wheels operatively connected with said shaft, a lifting disk secured to said shaft, a power lifting mechanism mounted on said front frame, including a rearwardly extending arm adapted to engage said lifting disk, and a lever operable from the seat of the tractor for tripping said power lift mechanism and operatively connecting said arm with said disk for actuating said frames about said pivot and lifting said planting units out of the ground.

8. A planter comprising a front frame, planting units mounted on said frame, a rear frame pivoted to said front frame, a shaft journalled in said rear frame, press wheels operatively connected with said shaft, a lifting disk secured to said shaft, a power lift mechanism mounted on said front frame including a rearwardly extending arm adapted to engage said lifting disk, a tripping mechanism associated with said power lift for controlling the operation of the same, and means associated with said power lift mechanism for locking said frames in angular position with respect to each other when said planting units are raised out of the ground.

9. A planter comprising a front frame, adjustable wheel supports for said frame, a plurality of planting units mounted on said frame, a rear frame pivoted to said front frame, a shaft journalled in said rear frame, press wheels operatively connected with said shaft, a lifting disk secured to said shaft, a power lift mechanism carried by said front frame, a rearwardly extending arm associated with said power lift mechanism and adapted to engage said lifting disk, a trip lever operatively connected with said power lift mechanism and adapted to be controlled by the operator on the seat of the tractor, a supporting arm pivoted to said rear frame, and a plurality of pivoted links associated with said power lifting mechanism, one of said links having a roller adapted to engage said supporting arm and the other of said links adapted to lock said frames in angular position with respect to each other for holding said planting units out of the ground in their inoperative position.

10. A planter comprising a front frame, adjustable wheel supports for said frame, a plurality of planting units mounted on said frame, a rear frame pivoted to said front frame, a shaft journalled in said rear frame, press wheels operatively connected with said shaft, a lifting disk secured to said shaft, a power lift mechanism carried by said front frame, a rearwardly extending arm associated with said power lift mechanism and adapted to engage said lifting disk, a trip lever operatively connected with said power lift mechanism and adapted to be controlled by the operator on the seat of the tractor, a supporting arm pivoted to said rear frame, a plurality of pivoted links associated with said power lifting mechanism, one of said links having a roller adapted to engage said supporting arm and the other of said links adapted to lock said frames in angular relation with respect to each other for holding said planting units out of the ground in their inoperative position, and means operated by the actuating of said trip lever to disengage said locking links for permitting said planting units to fall to the ground by gravity.

11. A lister planter comprising a front frame, adjustable wheel supports for said frame, a plurality of planting units mounted on said frame, a rear frame pivoted to said front frame, a shaft journalled on said rear frame, press wheels operatively connected to said shaft and located in longitudinal alignment with said planting units, a lifting disk secured to said shaft, a power lift mechanism secured to said front frame and overhanging said rear frame, including a rearwardly extending lifting arm adapted to engage said lifting disk, a trip lever associated with said lifting mechanism, a plurality of pivoted links associated with said lifting mechanism, certain of said links adapted to lock on dead center for supporting said planting units out of engagement with the ground, and a spring connecting said lever with certain of said links for normally returning said trip lever to its rearmost position and for holding said links in locked position.

12. A lister planter comprising a main frame, adjustable gauge wheels for supporting said main frame, planting units including a seed feeding mechanism and lister bases mounted on said main frame, a rear frame having its forward end pivoted to said main frame, a drive shaft journalled in said rear frame, press wheels operatively connected to said drive shaft, a lifting disk secured to said shaft, a power lifting mechanism mounted on said main frame and extending rearwardly therefrom, including a rearwardly extending pivoted lifting arm adapted to engage said lifting disk, a supporting bar pivoted to said rear frame, a plurality of pivoted links associated with said lifting mechanism, certain of said links having a roller adapted to engage a recess in said supporting member for locking said planting units in suspended position above the ground, and a trip lever associated with said lifting mechanism and adapted to actuate certain of said links for unlocking said roller from said support and permitting said planting units to drop to the ground by gravity.

13. A lister planter comprising a main frame, supporting front gauge wheels for said main frame, a plurality of planting units mounted on the rear end of said main frame including seed feeding mechanism and lister bases, a rear frame having its forward end pivoted to said main frame, a shaft journalled in said rear frame, press wheels mounted on said shaft and adapted to drive said shaft, a lifting disk secured to said shaft and adapted to be driven thereby, a power lift mechanism mounted on said main frame including a rearwardly projecting lifting arm adapted to engage said lifting disk, a trip lever for operatively connecting said lifting arm with said lifting disk, and means carried by said rear frame and engageable with said lifting arm for disengaging said arm from said lifting disk at the conclusion of said lifting operation.

14. A lister planter comprising a main frame, adjustable supporting gauge wheels for supporting the front end of said main frame, a plurality of spaced apart planting units mounted on the rear end of said main frame including seed feeding mechanisms and lister bases, a rear frame pivoted to said main frame, a shaft journalled on said rear frame, a plurality of spaced apart press wheels mounted on said shaft for driving the same, a lifting disk mounted on said shaft and operatively driven thereby, a power lift mechanism mounted on said main frame, a rearwardly extending pivoted lifting arm associated with said lifting mechanism and adapted to engage said lifting disk, a plurality of pivoted links for locking said frames in inoperative position and controlling the actuation of the power lift mechanism, a trip lever for actuating said links, a latch for locking said lifting arm out of engagement with said lifting disk, and a gravity actuated latch for disengaging said first named latch and releasing said lifting arm.

15. A lister planter comprising a main frame, supporting wheels for said main frame, a plurality of planting units mounted on said main frame, a rear frame pivoted to said main frame, supporting press wheels for said rear frame, a main shaft mounted in said rear frame and operatively driven by said press wheels, a lifting disk secured to said main shaft, a draft frame pivoted to the front end of said main frame and limited in its movement with respect thereto, and a power lift mechanism carried by said main frame and adapted to be operatively connected to said lifting disk for lifting said main frame with respect to said rear frame.

16. A lister planter comprising a main frame, supporting gauge wheels for said main frame, a plurality of planting units mounted on the rear end of said main frame, a rear frame pivoted to said main frame, a shaft journalled in said rear frame, a plurality of press wheels mounted on said shaft for driving the same, a lifting disk mounted on and driven by said shaft, a draft frame pivoted to said main frame for operatively connecting said main frame to the draw bar of a tractor, means for limiting the movement of said draft frame with respect to said main frame, and a power lift mechanism mounted on said main frame and adapted to be operatively connected to said lifting disk for raising said main frame and supporting the lister wholly on the draft bar of said tractor and the rear press wheels.

17. A lister planter comprising a main frame, adjustable gauge and supporting wheels mounted on the front end of said main frame and independently adjustable with respect to each other, a plurality of planting units mounted on the rear end of said main frame including seed feeding mechanisms and lister bases, a rear frame pivoted to said main frame, a shaft journalled in said rear frame, a plurality of press wheels mounted on and adapted to drive said shaft, a lifting disk secured to said shaft and driven thereby, a draft frame pivoted to said main frame and having connections for connecting the same to the draw bar of a tractor, a lever operable from the operator's seat on the tractor for adjusting the limit of the upward movement of said draft frame with respect to said main frame, a power lift mechanism carried by said main frame and adapted to be operatively connected to said lifting disk, and a trip lever operatively associated with said power lift mechanism for connecting said lifting mechanism with said lifting disk and raising said gauge wheels and lister bases from the ground and supporting said lister wholly on said tractor draw bar and press wheels.

18. A lister planter comprising a main frame, adjustable gauge and supporting wheels connected to the front end of said main frame, a plurality of equally spaced apart planting units mounted on the rear end of said main frame including seed feeding mechanism and plow bases, a rear frame pivoted to said main frame, a shaft journalled on the rear end of said rear frame, a plurality of spaced apart press wheels mounted on and operatively driving said shaft, a lifting disk secured to said shaft, a draft frame pivoted to the front end of said main frame and having its forward end adapted to be connected to the draw bar of a tractor, a lever operable from the seat of the tractor for limiting the pivotal movement upwardly of said draft frame, a power lift mechanism including a rearwardly extending pivoted lifting arm adapted to engage said lifting disk, a plurality of pivoted links associated with said power lift mechanism for locking said frames in angular inoperative position, and a trip lever controlled from the operator's seat on the tractor for unlocking said links and lowering said planting units to the ground.

19. A planter comprising a front frame, wheel support for said frame, a rear frame pivoted to said front frame, wheels for supporting said rear frame, a plurality of planting units carried by said front frame, means carried by said front frame for adjusting said wheel support for regulating the depth penetration of said planting units, and power lift mechanism carried by said front frame and operatively related to said rear supporting wheels for raising and lowering said planting units.

20. A lister planter comprising a main frame, adjustable gauge and supporting wheels connected to the front end of the said main frame, a plurality of equally spaced apart planting units mounted on the rear end of said main frame including seed feeding mechanism and plow bases, a rear frame pivoted to said main frame, a shaft journaled on the rear end of said rear frame, a plurality of spaced apart press wheels mounted on and operatively driving said shaft, a lifting disc secured to said shaft, a draft frame pivoted to the front end of said main frame and having its forward end adapted to be connected to the draw bar of a tractor, a lever operable from the seat of the tractor for limiting the pivotal movement upwardly of the draft frame, power lift mechanism including a rearwardly extending pivoted arm adapted to engage said lifting disc, and a plurality of pivoted links associated with said power lift mechanism for locking said frames in angular position with respect to each other.

21. A lister planter comprising a main frame, supporting wheels connected to said main frame, a plurality of planting units mounted on said main frame, a rear frame pivoted to said main frame, a shaft journalled on said rear frame, a plurality of press wheels mounted on and operatively driving said shaft, a lifting disc secured to said shaft, a draft frame pivoted to said main frame and having its forward end adapted to be connected to the draw bar of a tractor, a lever operable from the seat of the tractor for limiting the pivotal movement upwardly of said draft frame, and a power lift mechanism carried by said main frame and operatively related to said lifting disc for raising said main frame with respect to said rear frame.

22. A lister planter comprising a main frame, supporting wheels connected to said main frame, a plurality of equally spaced apart planting units mounted on the rear end of said main frame, a rear frame pivoted to said main frame, a shaft journalled on said rear frame, a plurality of press wheels mounted on and operatively driving said shaft, a lifting disc secured to said shaft, a draft frame pivoted to said main frame and having its forward end adapted to be connected to the draw bar of a tractor, a lever operable from the seat of the tractor for limiting the pivotal movement upwardly of said draft frame, a power lift mechanism carried by said main frame and operatively related to said lifting disc for raising said main frame with respect to said rear frame, and a plurality of pivoted links associated with said power lift mechanism for locking said frames in angular position with respect to each other.

HERMAN E. ALTGELT.